United States Patent [19]
Seifried et al.

[11] Patent Number: 5,531,003
[45] Date of Patent: Jul. 2, 1996

[54] FABRICATING A COMBINATION FEEDTHROUGH/CAPACITOR INCLUDING A METALLIZED TANTALUM OR NIOBIUM PIN

[75] Inventors: Lynn M. Seifried; Susan A. Tettemer, both of Minneapolis, Minn.

[73] Assignee: Medtronic, Inc., Minneapolis, Minn.

[21] Appl. No.: 355,377

[22] Filed: Dec. 13, 1994

Related U.S. Application Data

[63] Continuation-in-part of Ser. No. 38,273, Mar. 29, 1993, Pat. No. 5,312,377.

[51] Int. Cl.$^6$ ........................................ H01G 7/00
[52] U.S. Cl. ............................. 29/25.42; 361/302
[58] Field of Search ..................... 29/25.42, 25.03; 174/152, 50.61; 361/302, 307; 427/79

[56] References Cited

U.S. PATENT DOCUMENTS

| | | | |
|---|---|---|---|
| 1,180,614 | 4/1916 | Simpson | 428/662 |
| 3,304,362 | 2/1967 | August | 174/50.61 |
| 3,624,460 | 11/1971 | Correll | 29/25.03 X |
| 3,844,921 | 10/1974 | Benedict | 204/196 |
| 4,010,759 | 3/1977 | Boer | 174/152 GM X |
| 4,015,175 | 3/1977 | Kendall et al. | 361/313 |
| 4,107,762 | 8/1978 | Shirn et al. | 29/25.04 X |
| 4,424,551 | 1/1984 | Stevenson | 361/302 |
| 4,683,516 | 7/1987 | Miller | 361/328 |
| 4,791,391 | 12/1988 | Linnell | 361/302 |
| 5,104,755 | 4/1992 | Taylor et al. | 174/50.61 |
| 5,333,095 | 7/1994 | Stevenson et al. | 29/25.42 X |

FOREIGN PATENT DOCUMENTS

| | | | |
|---|---|---|---|
| 0331959 | 9/1989 | European Pat. Off. | |
| 892492 | 2/1981 | U.S.S.R. | 29/25.42 |

*Primary Examiner*—Peter Vo
*Attorney, Agent, or Firm*—Daniel W. Latham; Harold R. Patton

[57] ABSTRACT

Tantalum or niobium feedthrough conductor pins are provided with a thin, vacuum deposited metal coating to control oxidation growth during feedthrough fabrication. The coated feedthrough pins are incorporated into a feedthrough which includes a capacitive structure in electrical contact with the coated pin.

8 Claims, 2 Drawing Sheets

FABRICATING A COMBINATION FEEDTHROUGH/CAPACITOR INCLUDING A METALLIZED TANTALUM OR NIOBIUM PIN

This is a continuation-in-part of Ser. No. 08/038,273 filed Mar. 29, 1993 now U.S. Pat. No. 5,312,377.

BACKGROUND OF THE INVENTION

FIELD OF THE INVENTION

This invention relates to electrical feedthroughs of improved design and to their method of fabrication.

Electrical feedthroughs serve the purpose of providing an electrical circuit path extending from the interior of a hermetically sealed container to an external point outside the container. The conductive path is provided through the feedthrough by a conductor pin which is electrically insulated from the container itself. Many such feedthroughs are known in the art which provide the electrical path and seal the electrical container from its ambient environment. Such feedthroughs typically include a ferrule, the conductor pin or lead and a hermetic glass or ceramic seal which supports the pin within the ferrule. Such feedthroughs are typically used in electrical medical devices such as implantable pulse generators (IPG's). It has recently been discovered that such electrical devices can, under some circumstances, be susceptible to electromagnetic interference (EMI). At certain frequencies for example, EMI can inhibit pacing in an IPG. This problem has been addressed by incorporating a capacitor structure within the feedthrough ferrule thus shunting any EMI at the entrance to the IPG for high frequencies. This has been accomplished with the aforementioned capacitor device by combining it with the feedthrough and incorporating it directly into the feedthrough ferrule. Typically, the capacitor electrically contacts the pin lead and the ferrule.

Some of the more popular materials for use as the pin lead include tantalum and niobium. Unfortunately, tantalum and niobium are susceptible to oxide growth which can, depending on its extent, act as an insulator instead of a conductor over the surface of the pin lead. During fabrication of a feedthrough/capacitor combination, the pin is subjected to one or more heat treatments which can encourage oxidation, affecting the conductivity of the pin lead and its ability to make good electrical connections between other elements including the capacitor and so forth.

SUMMARY OF THE INVENTION

This invention solves the oxide problem by providing a protective metal coating on the tantalum or niobium pin lead to control its tendency to oxide growth.

BRIEF DESCRIPTION OF THE DRAWINGS

A detailed description of the invention is hereafter described with specific reference being made to the drawings in which.

DETAILED DESCRIPTION

Figure 1:
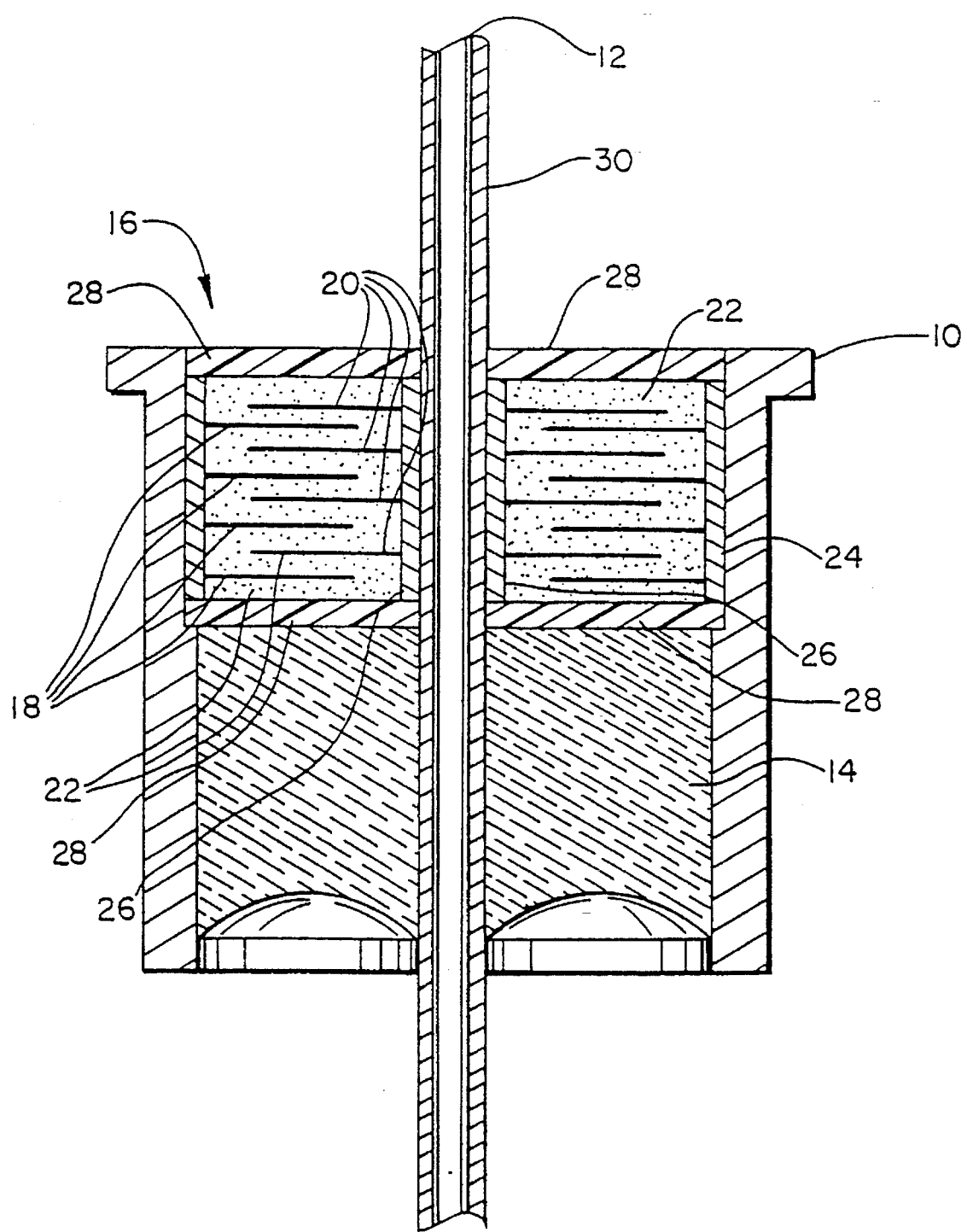
FIG. 1 is a sectional view of one embodiment of a feedthrough in accordance with this invention.

Referring now to the drawing in specific detail, there is shown one embodiment of an electrical feedthrough which is intended for use with an IPG (not shown). The invention will be specifically described with reference to IPG's, however, it is to be understood that it is of general application to any feedthrough utilizing a tantalum or niobium pin lead for the purpose of making electrical connection to any "contained" electrical device which is to be sealed from its ambient environment, including multiple pin feedthroughs as well.

Electrical feedthroughs are typically annular in shape as shown in the Figures and usually include a metal ferrule 10 which may be of a titanium alloy in the case of a typical IPG. Ferrule 10 retains the electrical pin lead 12 which is of tantalum or niobium and an insulator seal means 14 which is comprised of a body of glass which when molten is applied between pin 12 and ferrule 10 to form the seal means as shown in the Figure upon solidification. This process is generally referred to as "glassing" in the art. Ultimately, the ferrule is attached, as by welding, to the casing or cover of the container (not shown) for the electrical device which the feedthrough is to be associated. In the instance of an IPG, for example, the container might also be of titanium and the feedthrough ferrule would be welded thereto in such a way as to allow the bottom of the ferrule to extend into the container for the purpose of making electrical connection between the bottom end of pin 12 and the electrical contents thereof. Thus, a portion of the ferrule as attached to the container may extend into the interior of the container and a portion may extend exteriorly thereof in a typical installation. Various modifications of this installation configuration are, of course, possible and will be readily apparent to those familiar with this art.

As already indicated, the feedthrough of this invention is of the type which combines a capacitor within the feedthrough ferrule. The capacitive structure generally detailed schematically at 16 may comprise a multi-layer ceramic structure of annular discoidal shape having several sets of thin-spaced apart electrically conductive plates 18 and 20 (termed electrodes) separated by thin layers of ceramic dielectric insulating material 22. The capacitor also includes first and second mutually isolated electrically conductive exterior and interior surfaces 24 and 26 (called termed "terminations") and insulative end surfaces 28. Such capacitive structures are known in the art and need not be described herein further detail.

During fabrication of the ferrule/capacitor combination structure shown in FIG. 1, several heat treatments are necessary to cure the epoxy. These heat treatments occur in ambient at approximately 300° C. During these heat treatments, the oxide on the pin 12 tends to increase in thickness. At some point, this oxide begins to act as an insulator instead of a conductor if its growth is not controlled. The presence of an oxide layer is reflected in the dissipation factor (df) value which can be very high, on the order of 10 percent to 99 percent if a thick oxide is present. The df value is indicative of the quality of the electrical connection between the capacitor and the feedthrough pin 12 and capacitor and ferrule. It has also been noted that the df values are also inconsistent among feedthroughs and especially between feedthrough lots. This is due to the difficulty in controlling the oxide growth on the surface of the tantalum or niobium pin. On the other hand, it has also been noted that the contact resistance of the feedthrough ferrule has a minimal influence on these df values.

As a result of the recognition of this problem, it was discovered that a metallic film or coating 30 placed on the pin would minimize and control the growth of the oxide thereon. Controlling the growth of the oxide film in this manner was found to improve electrical contact to the pin and lower the df values. However, tantalum cannot be electroplated because of the presence of the ever present oxide layer. Consequently, it was decided that a thin film 30 of protective metal could be best sputtered onto the surface of the tantalum pin utilizing well known sputtering techniques. Other metallizing or coating procedure such as any vacuum deposition techniques and the like may also be used as well as spraying or painting a metallic paste on the pin which is usually fired later on.

The protective metal coating may be applied over the entire pin or it may be applied only to that portion of the pin which is to be contacted by the capacitor. In either event, it can be said that at least a portion of the pin is to be metallized with a protective conductive metal coating according to this invention. Thickness of the coating is not critical if the coating is applied after glassing so long as it is substantially continuous in its coverage. Thickness in the range of about 500Å to about 10,000Å have been satisfactory.

Depending on whether the pin is metallized with coating 30 prior to glassing or subsequent to glassing, certain considerations will dictate the particular metal or metals which can be utilized. For example, if the entire pin is metallized with the protective metal coating prior to glassing, then the protective metal selected must be of the type which is soluble in the tantalum or niobium pin material and the processing should be controlled to allow complete diffusion into the pin material so that the sealing glass will "see" the tantalum or niobium and therefore wet and react with the pin material and not only with the metallized coating thereon. Consequently, for purposes of this invention, the only such metals which can be selected in such an instance are gold, platinum, palladium and titanium, the first two being most preferred. The coating must not be too thick so as to prevent "seeing" the tantalum or niobium. Again, coatings on the order of 500Å to 10,000Å have proved to be satisfactory although this can be varied.

On the other hand, if the tantalum or niobium pin is glassed prior to being metallized, then any good conductive metal coating may be utilized. Examples of such metals, to name only a few, are nickel, copper, molybdenum, tungsten, hafnium, aluminum, indium, iridium, zinc and the aforementioned gold, platinum, palladium and titanium, other metals may well occur to those familiar with this art for this use as well.

In accordance with this invention, the preferred procedure is to coat the pin first followed by glassing because it would require a more elaborate sputtering fixturing to sputter the feedthrough after the pin is sealed therein. Simple less complicated fixturing is utilized in sputtering the pin alone and is therefore preferred. Also, if sputtered after, the coating may be less adherent unless other preparation procedures are done first.

In accordance with the preferred embodiments of this invention, each of the three metals gold, platinum and palladium were sputtered onto tantalum pins using a standard Rf sputter system. Initial contact resistance screenings indicated that all three metals were comparable and feedthroughs were fabricated using pins coated with gold or platinum. The large df values of feedthroughs with uncoated tantalum pins ranged anywhere between 5 percent to greater than 90 percent. However, feedthroughs having gold plated tantalum pins demonstrated an average df value of 7.9 percent. The average df value for feedthroughs having platinum coated pins was 6.89 percent. Clearly, these values are far superior to those of feedthroughs having uncoated tantalum pins. In addition, these df values are close to the df values for feedthroughs with platinum pins, which are the customary terminal material in commercial feedthrough filters. Typical values for platinum pins are between 5 percent and 10 percent.

As already indicated, other metals may be used to coat the tantalum or niobium pins. If the pins are to be coated prior to glassing the metals should be soluble in the pin material to allow the formation of an appropriate seal between the glass and the tantalum. The preferred metals for this purpose are platinum, gold, palladium and titanium. As already indicated, a wide variety of metals may be utilized for the protective metallization coating and there is no need for solubility concerns if the pins are coated after the glassing step.

Figure 2:
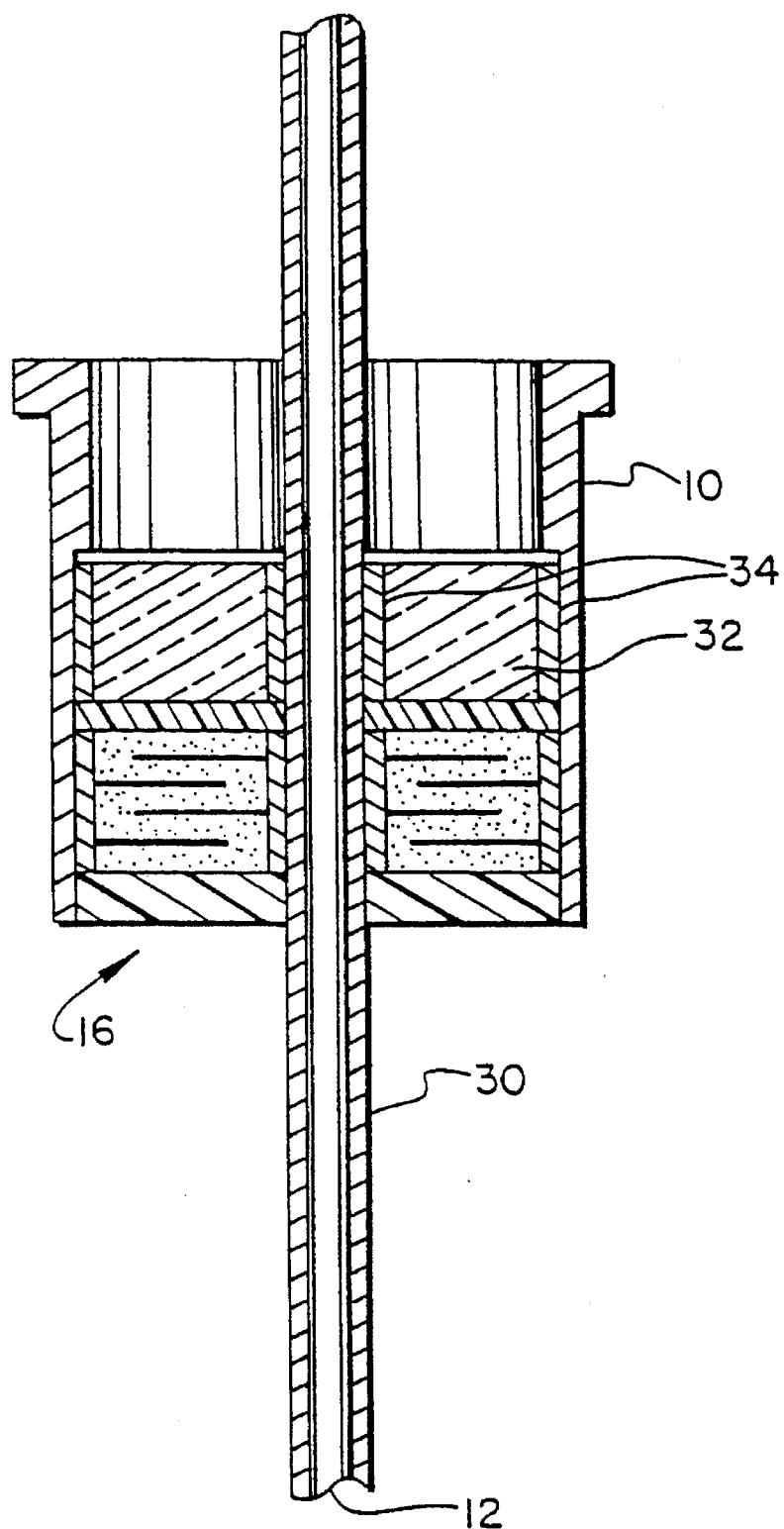
FIG. 2 is a sectional view of another embodiment of a feedthrough in accordance with this invention.

Referring now to FIG. 2, another feedthrough embodiment making use of the invention is shown. This feedthrough involves a brazed construction having a tantalum pin 12 with metal coating 30 extending through a metal ferrule 10 as in the FIG. 1 version. Also included is a capacitive structure generally designated 16 which is the same as the one shown in FIG. 1. Pin 12 is positioned and sealed into ferrule 10 by means of annular ceramic insulator disc 32 and braze 34, which may be of gold for example. The same considerations as to the coating on the pin, when it should be applied to are applicable with respect to the braze as well, applicable with respect to the glass seal 14 in the embodiment shown in FIG. 1.

While the preferred embodiments have been described in detail, this has not been done for purposes of limitation but by way of illustration only. The invention is intended to be defined by the following claims This completes the description of the preferred and alternate embodiments of the invention. Those skilled in the art may recognize other equivalents to the specific embodiments disclosed and described herein which equivalents are intended to be encompassed by the claims attached hereto.

What is claimed is:

1. A method of fabricating a combination feedthrough/capacitor comprising the steps:

metallizing a tantalum or niobium pin with a vacuum deposited thin film coating selected from the group consisting of gold, platinum, palladium and titanium;

inserting the pin through a metal ferrule and supporting it therein with a brazed ceramic body, and contacting the pin with a capacitive structure within the ferrule.

2. The method of claim 1 wherein the metallization is accomplished by sputtering.

3. The method of claim 1 wherein the entire pin is coated.

4. The method of claim 1 wherein only that portion of the pin contacting the capacitive structure is coated.

5. The method of claim 1 in which the protective metal is selected from the group consisting of gold, platinum, palladium and titanium.

6. A method of fabricating a combination feedthrough/capacitor comprising the steps:

inserting a tantalum or niobium pin through a metal ferrule and positioning same therein with a brazed ceramic insulator body;

metallizing at least that portion of the pin to be contacted by a capacitive structure with a thin film, vacuum deposited protective metal coating selected to protect the pin from oxidation growth, and contacting the pin with a capacitive structure within the ferrule.

7. The method of claim 6 wherein the metal coating is sputtered onto the pin.

8. The method of claim 6 in which the protective metal is selected from the group consisting of gold, platinum, palladium and titanium.

* * * * *